US011003171B2

(12) United States Patent
Takeuchi et al.

(10) Patent No.: US 11,003,171 B2
(45) Date of Patent: May 11, 2021

(54) PARAMETER SETTING DEVICE, SYSTEM, AND PARAMETER SETTING METHOD

(71) Applicant: FANUC CORPORATION, Yamanashi (JP)

(72) Inventors: Naoya Takeuchi, Yamanashi-ken (JP); Rikizou Watanabe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 71 days.

(21) Appl. No.: 16/682,276

(22) Filed: Nov. 13, 2019

(65) Prior Publication Data

US 2020/0159191 A1 May 21, 2020

(30) Foreign Application Priority Data

Nov. 16, 2018 (JP) .............................. JP2018-215682

(51) Int. Cl.
*G05B 19/416* (2006.01)
*G05B 19/4093* (2006.01)

(52) U.S. Cl.
CPC ..... *G05B 19/416* (2013.01); *G05B 19/40937* (2013.01); *G05B 2219/37372* (2013.01)

(58) Field of Classification Search
None
See application file for complete search history.

(56) References Cited

U.S. PATENT DOCUMENTS

| 2010/0109594 | A1 | 5/2010 | Miyaji | |
|---|---|---|---|---|
| 2015/0352679 | A1* | 12/2015 | Yamamoto | ........... B23Q 17/007 73/865.8 |
| 2020/0159184 | A1* | 5/2020 | Takeuchi | ........... G05B 19/4083 |

FOREIGN PATENT DOCUMENTS

| JP | S59192710 | U | 12/1984 | | |
|---|---|---|---|---|---|
| JP | 61098409 | A | * | 5/1996 | ........... G05B 19/416 |
| JP | 08314531 | A | | 11/1996 | |
| JP | 11226799 | | | 8/1999 | |
| JP | 2006346760 | A | | 12/2006 | |
| JP | 2007226836 | A | | 9/2007 | |
| JP | 2009075954 | A | | 4/2009 | |
| JP | 2010108399 | A | | 5/2010 | |

(Continued)

OTHER PUBLICATIONS

English abstract of JP-61098409-A (1996).*

*Primary Examiner* — Ryan A Jarrett (74) *Attorney, Agent, or Firm* — Robert P. Michal, Esq.; Carter, DeLuca & Farrell (57) ABSTRACT

A parameter setting device is configured to set a parameter relating to a speed of a table of a machine tool in accordance with the weight of an object placed on the table. The parameter setting device includes: an operation control unit configured to provide control such that the table is operated according to a predetermined operation; a positional change obtaining unit configured to obtain a positional change of the table; a storage unit that stores the parameter corresponding to the positional change caused when the table is operated according to the predetermined operation; and a parameter setting unit configured to set, by using the storage unit, the parameter based on the positional change obtained by the positional change obtaining unit when the operation control unit operates the table according to the predetermined operation.

12 Claims, 6 Drawing Sheets

(56) References Cited

FOREIGN PATENT DOCUMENTS

| | | | |
|---|---|---|---|
| JP | 2014172107 | A | 9/2014 |
| JP | 2014191631 | A | 10/2014 |
| JP | 2018119840 | A | 8/2018 |

* cited by examiner

PARAMETER SETTING DEVICE, SYSTEM, AND PARAMETER SETTING METHOD

CROSS-REFERENCE TO RELATED APPLICATION

This application is based upon and claims the benefit of priority from Japanese Patent Application No. 2018-215682 filed on Nov. 16, 2018, the contents of which are incorporated herein by reference.

BACKGROUND OF THE INVENTION

Field of the Invention

The present invention relates to a parameter setting device for setting a parameter relating to the speed of a table of a machine tool, a system having the parameter setting device, and a parameter setting method.

Description of the Related Art

In general, a machine tool performs machining operation with a machining jig, an additional axis table, etc. in addition to the workpiece being mounted on a table of the machine tool. It is therefore necessary to set parameters, such as a time constant relating to the speed of the table, in consideration of the weight of the objects mounted on the table. Conventionally, as described in Japanese Laid-Open Patent Publication No. 08-314531, in the machine tools, such parameters have been manually set.

SUMMARY OF THE INVENTION

When parameters relating to the table speed are manually set as described in Japanese Laid-Open Patent Publication No. 08-314531, there is a fear that the parameters might be set without considering the weight of the objects placed on the table, possibly resulting in parameter values inappropriate for the actual weight of the objects on the table. Performing machining operation with parameter settings corresponding to a heavier weight than the weight of the objects on the table may unnecessarily lengthen machining cycle time disadvantageously. On the other hand, performing machining operation with parameter settings corresponding to a lighter weight than the weight of the objects on the table may damage the machine tool, deteriorate machining accuracy to the workpiece, and shorten the life of the machine tool disadvantageously.

Accordingly, an object of the present invention is to provide a parameter setting device that is capable of automatically setting a parameter relating to the speed of the table in a manner appropriate for the weight of objects placed thereon, a system, and a parameter setting method.

According to a first aspect of the present invention, there is provided a parameter setting device that is configured to set a parameter relating to a speed of a table of a machine tool in accordance with a weight of an object placed on the table. The parameter setting device includes: an operation control unit configured to provide control in a manner that the table is operated according to a predetermined operation; a positional change obtaining unit configured to obtain a positional change of the table; a storage unit that stores the parameter corresponding to the positional change caused when the table is operated according to the predetermined operation; and a parameter setting unit configured to set, by using the storage unit, the parameter based on the positional change obtained by the positional change obtaining unit when the operation control unit operates the table according to the predetermined operation.

According to a second aspect of the present invention, there is provided a system including: the parameter setting device described above; and a driving control unit configured to perform a speed control of the table based on the parameter set by the parameter setting unit.

According to a third aspect of the present invention, there is provided a parameter setting method for setting a parameter relating to a speed of a table of a machine tool in accordance with a weight of an object placed on the table. The parameter setting method includes: an operation control step of providing control in a manner that the table is operated according to a predetermined operation; a positional change obtaining step of obtaining a positional change of the table; and a parameter setting step of, by using a storage unit storing the parameter corresponding to the positional change caused when the table is operated according to the predetermined operation, setting the parameter based on the positional change obtained in the positional change obtaining step when the operation control step operates the table according to the predetermined operation.

According to the present invention, it is possible to automatically set a parameter relating to the speed of the table appropriately for the weight of the objects placed thereon.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The parameter setting device, system, and parameter setting method according to the present invention will now be described in detail in conjunction with preferred embodiments while referring to the accompanying drawings.

EMBODIMENT

Figure 1:
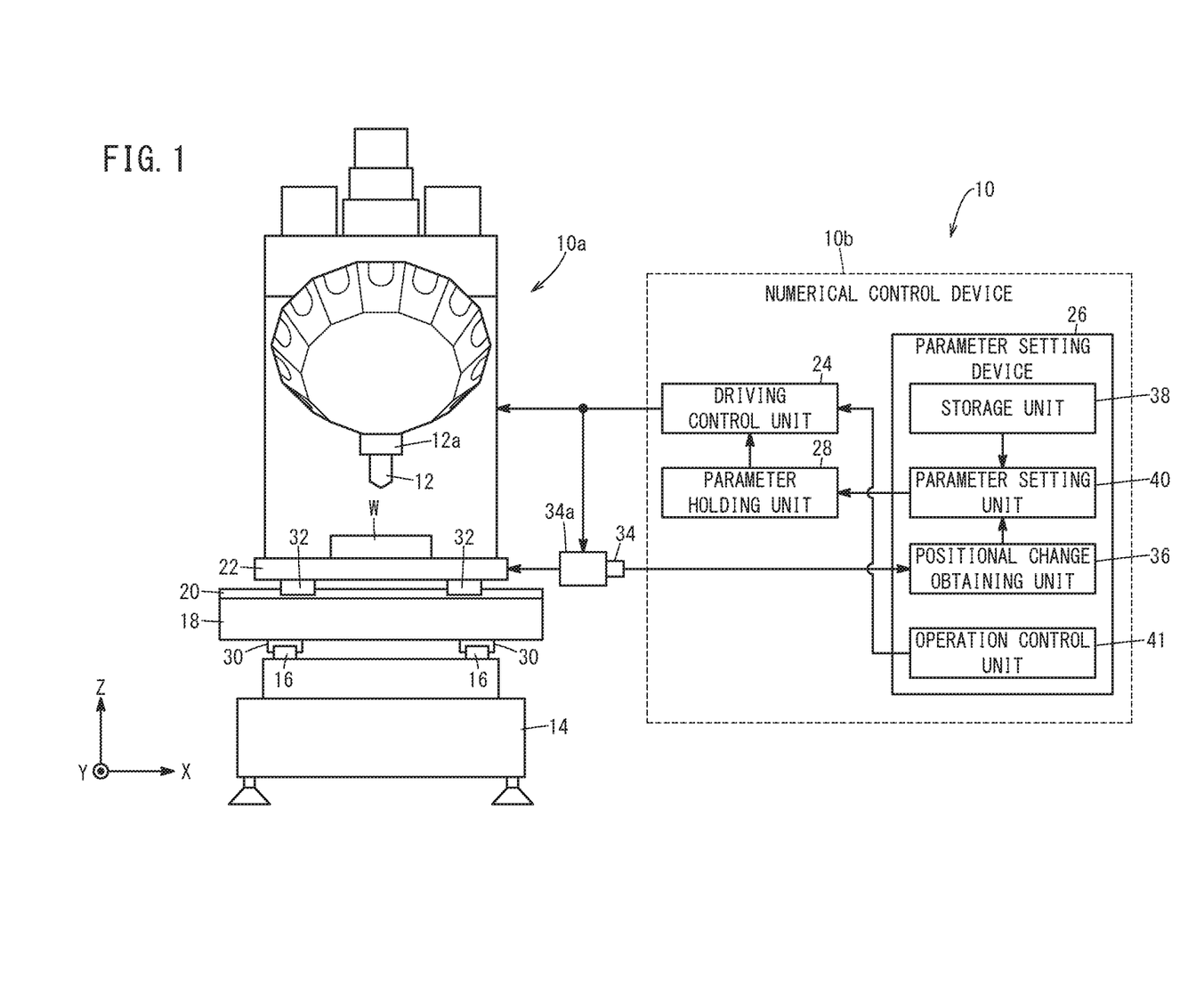
FIG. 1 is a diagram illustrating the configuration of a system according to an embodiment.

FIG. 1 is a diagram illustrating the configuration of a system 10 according to an embodiment. The system 10 is a machine tool that includes a machine tool body 10a and a numerical control device 10b. The system 10 may hereinafter be also referred to as a machine tool 10. The machine tool body 10a includes a tool 12, a spindle 12a, a bed 14, Y-axis rails 16, a saddle 18, X-axis rails 20, and a table 22. The numerical control device 10b controls the relative position between the tool 12 and the table 22 of the machine tool body 10a, whereby a workpiece W on the table 22 is machined. The numerical control device 10b includes a driving control unit 24, a parameter setting device 26, and a parameter holding unit 28.

The Y-axis rails 16 are disposed on the bed 14 so as to extend in the Y-axis direction. The saddle 18 has movement members 30 that are capable of linear movement on the Y-axis rails 16 in the Y-axis direction, and can thus move in the Y-axis direction on the Y-axis rails 16. The saddle 18 can be moved in the Y-axis direction by driving of a Y-axis motor (not shown) that is controlled by the driving control unit 24.

The X-axis rails 20 are disposed on the saddle 18 so as to extend in the X-axis direction. The table 22 has movement members 32 that are capable of linear movement on the X-axis rails 20 in the X-axis direction and can thus move in the X-axis direction on the X-axis rails 20. The table 22 can be moved in the X-axis direction by driving of an X-axis motor 34a that is controlled by the driving control unit 24. The saddle 18 supports the table 22 in this way, and the driving control unit 24 enables the workpiece W on the table 22 to move in the X-axis direction and Y-axis direction.

A measurement unit 34 is provided to the X-axis motor 34a. The measurement unit 34 is composed of an encoder of the X-axis motor 34a.

The parameter setting device 26 includes a positional change obtaining unit 36, a storage unit 38, a parameter setting unit 40, and an operation control unit 41.

The operation control unit 41 sends a control signal to the driving control unit 24 such that the table 22 operates according to a predetermined operation. The driving control unit 24 controls the X-axis motor 34a according to the control signal.

The positional change obtaining unit 36 obtains a change in position of the table 22 on the basis of a measurement value measured by the encoder constituting the measurement unit 34.

The storage unit 38 stores a parameter or parameters that are associated with the positional change caused when the table 22 is operated according to the above-mentioned predetermined operation. In this embodiment, the parameter (s) can be those relating to a moving speed (speed) of the table 22. Specific examples of the parameters include a time constant for determining acceleration of the table 22, a maximum speed of the table 22, and so on. The parameter(s) may include at least one of the time constant and maximum speed, or may include the time constant and the maximum speed. Causing the machine tool 10 to perform appropriate machining operation requires that the parameters relating to the moving speed of the table 22 be determined in accordance with the weight of the objects placed on the table 22. The storage unit 38 may store parameters respectively for the X-axis direction and the Y-axis direction.

Figure 2:
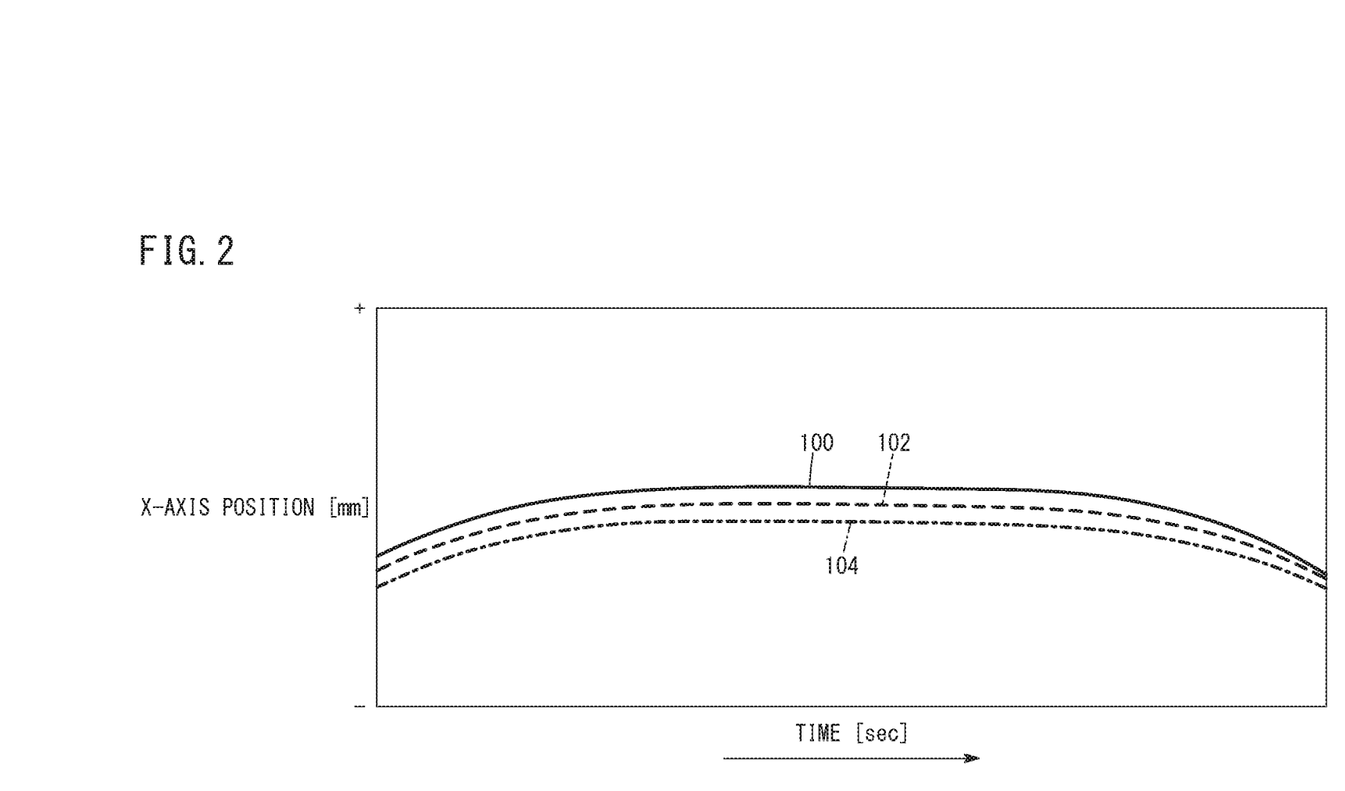
FIG. 2 is a diagram illustrating change in position that depends on the weight of the objects placed on the table.

FIG. 2 is a diagram illustrating the positional change associated with the weight of the objects placed on the table 22. Specifically, the diagram shows changes in position that are caused when the operation control unit 41 operates the table 22 according to a predetermined operation, by weight of the objects placed on the table 22. The vertical axis represents the X-axis position and the horizontal axis represents the time from start to end of the predetermined operation. Specific examples of the predetermined operation performed by the operation control unit 41 includes an operation in which the X-axis position of the table 22 changes from X1 to X2 at a predetermined command speed and then returns to X1. The command speed is a speed that is set to be slow enough not to damage the driving system, which can be changed by an operator. The positional change is a change in position from the start time to end time of the predetermined operation.

FIG. 2 shows, by weight, positional changes in the X-axis direction that are caused when the table 22 is moved at the above command speed in the X-axis direction according to the predetermined operation by the operation control unit 41 controlling the driving control unit 24. Line 100 shown in FIG. 2 indicates a positional change in the case where the weight of the objects placed on the table 22 is 0 kg. Line 102 indicates a positional change in the case where the weight of the objects is 130 kg, and line 104 indicates a positional change in the case where the weight of the objects is 260 kg. In this way, the positional change of the table 22 varies depending on the weight of the objects.

Accordingly, the storage unit 38 stores parameters associated with the positional changes corresponding to the weights of the objects. That is, the storage unit 38 stores a parameter corresponding to the positional change shown by line 100, a parameter corresponding to the positional change shown by line 102, and a parameter corresponding to the positional change shown by line 104. For the sake of clarity, in this embodiment, the storage unit 38 stores parameters corresponding to positional changes in accordance with three types of weight, but it may store parameters corresponding to positional changes in accordance with two or four or more of types of weight. For example, the storage unit 38 may store parameters corresponding to positional changes in accordance with weight that is increased by smaller increments.

The parameter setting unit 40 sets parameters into the parameter holding unit 28. Specifically, the parameter setting unit 40 obtains from the storage unit 38 a parameter that corresponds to the positional change that was obtained by the positional change obtaining unit 36 when the table 22 was caused to perform the predetermined operation. Then, the parameter setting unit 40 sets the obtained parameter into the parameter holding unit 28. That is, by using a relation between the positional change and the time constant or a relation between the positional change and the maximum speed stored in the storage unit 38, the parameter setting unit 40 sets into the parameter holding unit 28 the time constant or the maximum speed as a parameter corresponding to the positional change obtained.

Even if the positional change obtained by the positional change obtaining unit 36 is different from positional changes stored in the storage unit 38, the parameter setting unit 40 may determine a parameter to be set in the parameter holding unit 28 by performing an interpolation calculation. Alternatively, the parameter setting unit 40 may set into the parameter holding unit 28 a parameter corresponding to a positional change that is closest to the positional change obtained by the positional change obtaining unit 36. In this way, the parameter setting unit 40 can determine a parameter that is optimum for the weight corresponding to the positional change obtained by the positional change obtaining unit 36.

The parameter holding unit 28 is a storage medium that holds (stores) parameters. The driving control unit 24 controls the speed of the table 22 on the basis of the set parameters held in the parameter holding unit 28. That is, the driving control unit 24 controls the speed of the table 22 according to the time constant, the maximum speed set by the parameter setting unit 40, so that the workpiece W is machined. The driving control unit 24 performs a speed control of the table 22 in the X-axis direction and a speed control in the Y-axis direction on the basis of the set parameters.

Figure 3:
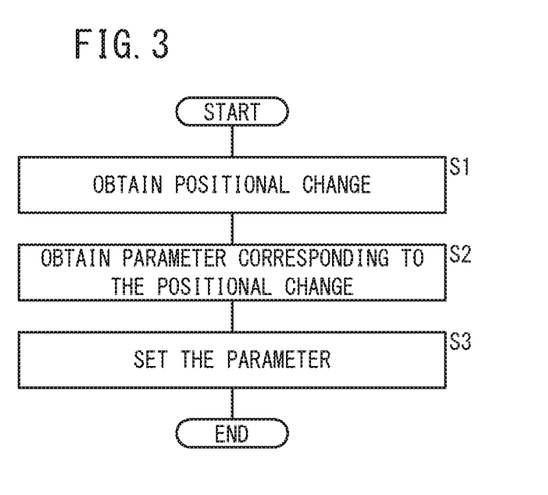
FIG. 3 is a flowchart illustrating a parameter setting method by the parameter setting device.

FIG. 3 is a flowchart illustrating a parameter setting method by the parameter setting device 26. First, on the basis of measurement that is made by the measurement unit 34 when the operation control unit 41 operates the table 22 according to a predetermined operation, the positional change obtaining unit 36 obtains a positional change of the table 22 (step S1).

Next, the parameter setting unit 40 obtains from the storage unit 38 a parameter that corresponds to the positional change obtained by the positional change obtaining unit 36 at step S1 (step S2).

Then, the parameter setting unit 40 sets the parameter obtained at step S2 into the parameter holding unit 28 (step S3). The process of automatically setting a parameter is thus completed.

According to the parameter(s) set in the parameter holding unit 28 at step S3, the driving control unit 24 controls the speed of the table 22 to thereby drive the table 22, so that the workpiece W can be machined suitably.

According to the parameter setting device 26, the system 10, and the parameter setting method according to the embodiment, it is possible to automatically set a parameter relating to the speed of the table 22 of the machine tool 10 in a manner appropriate for the weight of objects placed thereon, by moving the table 22. This enables the speed of the table 22 to be controlled appropriately in accordance with the weight of the objects placed thereon. This in turn makes it possible to optimize machining cycle time, enhance machining accuracy to the workpiece W without damaging the machine tool 10, and lengthen the life of the machine tool 10.

MODIFICATIONS

The above-described embodiment can be modified as described below.

First Modification

Figure 4:
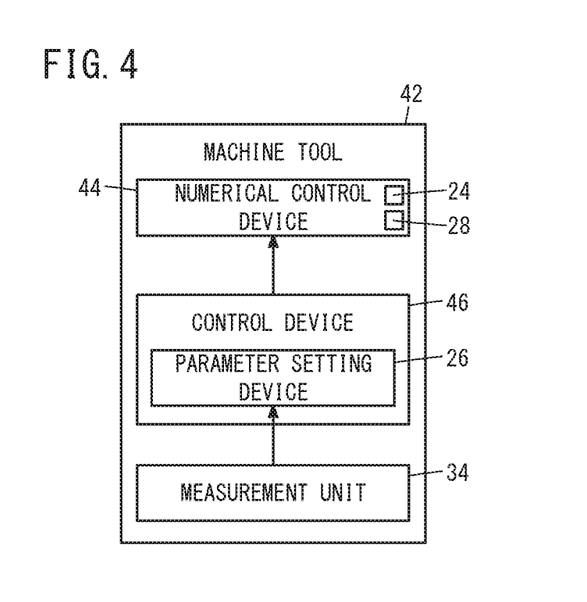
FIG. 4 is a diagram showing the configuration of a system according to a first modification.

FIG. 4 is a diagram illustrating the configuration of a system 42 according to a first modification. The system 42 is a machine tool and will hereinafter be referred to as a machine tool 42. The machine tool 42 is configured similarly to the machine tool 10 of FIG. 1. However, in the machine tool 42, a control device 46 that is different from the numerical control device 44 includes the parameter setting device 26. Providing the control device 46, such as a personal computer or microcomputer different from the numerical control device 44, with the function of the parameter setting device 26 makes it possible to improve the maintenance workability without considerably changing the configuration of the numerical control device 44. The numerical control device 44 here includes the driving control unit 24 and the parameter holding unit 28.

Second Modification

Figure 5:
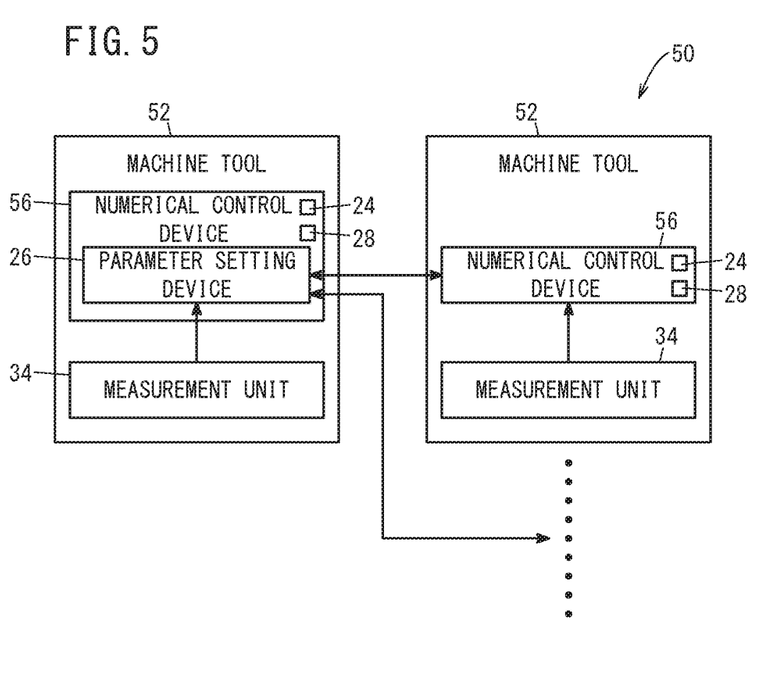
FIG. 5 is a diagram showing the configuration of a system according to a second modification.

FIG. 5 is a diagram illustrating the configuration of a system 50 according to a second modification. The system 50 is a machine tool system that includes multiple machine tools 52 each including a numerical control device 56. In the second modification, the numerical control device 56 of one of the multiple machine tools 52 includes the parameter setting device 26. Here, each machine tool 52 includes the measurement unit 34, and each numerical control device 56 includes the driving control unit 24 and the parameter holding unit 28.

In the second modification, the parameter setting device 26 sets parameters for each individual machine tool 52 on the basis of the positional change obtained from the measurement unit 34 of each of the multiple machine tools 52. In this way, even when the system 50 includes an increased number of machine tools 52, the parameter setting device 26 provided in one numerical control device 56 can set parameters for each individual machine tool 52 in accordance with the weight of the objects placed on the table 22 of each of all machine tools 52. Thus, even with a machine tool system including multiple machine tools 52, it is possible to automatically set appropriate parameters relating to the speed of the table 22 of each machine tool 52. The storage unit 38 of the parameter setting device 26 may store a parameter associated with the positional change for each individual machine tool 52.

Third Modification

Figure 6:
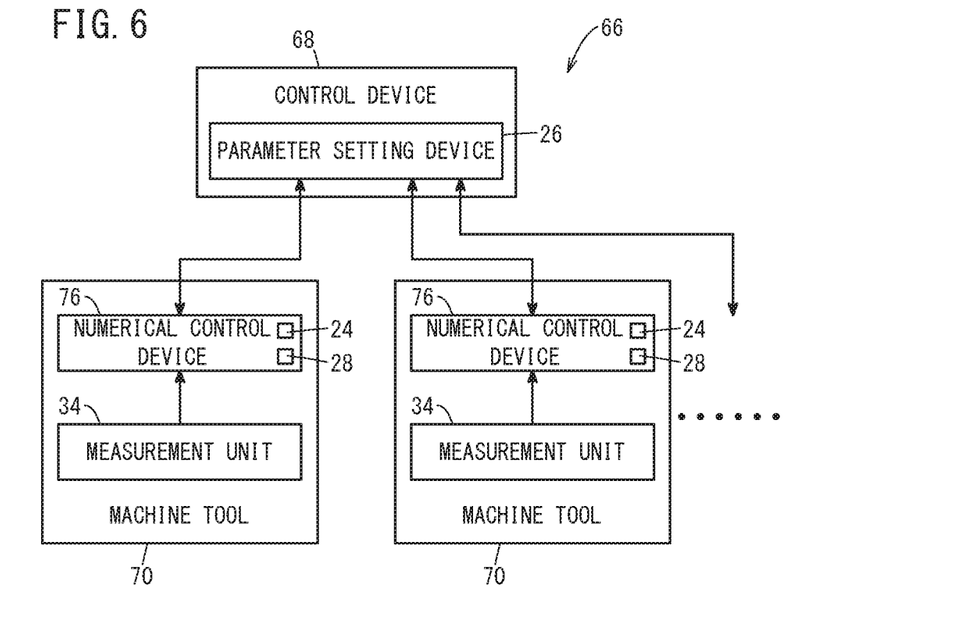
FIG. 6 is a diagram showing the configuration of a system according to a third modification.

FIG. 6 is a diagram illustrating the configuration of a system 66 according to a third modification. The system 66 is a machine tool system that includes a control device 68 and multiple machine tools 70 each including a numerical control device 76. In the third modification, the control device 68, such as a personal computer or microcomputer different from the numerical control devices 76, includes the parameter setting device 26. Here, the machine tools 70 each include the measurement unit 34 and each numerical control device 76 includes the driving control unit 24 and the parameter holding unit 28.

In the third modification, the parameter setting device 26 sets parameters for each individual machine tool 70 on the basis of the positional change obtained from the measurement unit 34 of each of the multiple machine tools 70. In this way, even when the system 66 includes an increased number of machine tools 70, the parameter setting device 26 provided in the control device 68 can set parameters for each individual machine tool 70 in accordance with the weight of the objects placed on the table 22 of each of all machine tools 70. Thus, even with a machine tool system including multiple machine tools 70, it is possible to automatically set parameters relating to the speed of the table 22 of each machine tool 70 in an appropriate manner without considerably changing the configuration of the numerical control devices 76. The storage unit 38 of the parameter setting device 26 may store a parameter associated with the positional change for each individual machine tool 70.

Invention Obtained from Embodiments

The invention that can be grasped from the above-described embodiments will be recited below.

First Invention

The parameter setting device (26) is configured to set a parameter relating to a speed of a table (22) of a machine tool (10, 42, 52, 70) in accordance with the weight of an object placed on the table (22). The parameter setting device (26) includes: an operation control unit (41) configured to provide control such that the table (22) is operated according to a predetermined operation; a positional change obtaining unit (36) configured to obtain a positional change of the table (22); a storage unit (38) that stores the parameter corresponding to the positional change caused when the table (22) is operated according to the predetermined operation; and a parameter setting unit (40) configured to set, by using the storage unit (38), the parameter based on the positional change obtained by the positional change obtaining unit (36) when the operation control unit (41) operates the table (22) according to the predetermined operation.

Thus, it is possible to automatically set a parameter relating to the speed of the table (22) of the machine tool (10, 42, 52, 70) in a manner appropriate for the weight of the objects placed thereon, by moving the table (22). This makes it possible to perform a suitable speed control of the table (22) in accordance with the weight of the objects placed thereon. This in turn makes it possible to optimize the machining cycle time, improve the machining accuracy to the workpiece (W) without damaging the machine tool (10, 42, 52, 70), and lengthen the life of the machine tool (10, 42, 52, 70).

The parameter may include at least one of a time constant and a maximum speed.

Second Invention

A system (10, 42, 50, 66) includes: the parameter setting device (26) described above; and a driving control unit (24) configured to perform a speed control of the table (22) based on the parameter set by the parameter setting unit (40).

Thus, it is possible to automatically set a parameter relating to the speed of the table (22) of the machine tool (10, 42, 52, 70) in a manner appropriate for the weight of the objects placed thereon, by moving the table (22). This makes it possible to perform a suitable speed control of the table (22) in accordance with the weight of the objects placed thereon. This in turn makes it possible to optimize the machining cycle time, improve the machining accuracy to the workpiece (W) without damaging the machine tool (10, 42, 52, 70), and lengthen the life of the machine tool (10, 42, 52, 70).

The system (10, 42) may be the machine tool (10, 42).

A numerical control device (10b) of the machine tool (10) may include the parameter setting device (26) and the driving control unit (24).

A numerical control device (44) of the machine tool (42) may include the driving control unit (24), and a control device (46) different from the numerical control device (44) may include the parameter setting device (26). It is thus possible to improve the maintenance workability without considerably changing the configuration of the numerical control device (44).

The system (50) may include a plurality of the machine tools (52) each including a numerical control device (56). Each of the numerical control devices (56) may include the driving control unit (24), and the numerical control device (56) of one of the plurality of machine tools (52) may include the parameter setting device (26). With this configuration, even with a machine tool system including a plurality of machine tools (52), it is possible to automatically set appropriate parameters relating to the speeds of the tables (22) of the individual machine tools (52).

The system (66) may include a plurality of the machine tools (70) each including a numerical control device (76). Each of the numerical control devices (76) may include the driving control unit (24), and a control device (68) different from the numerical control devices (76) may include the parameter setting device (26). Then, even with a machine tool system including a plurality of machine tools (70), it is possible to automatically set appropriate parameters relating to the speeds of the tables (22) of the individual machine tools (70) without considerably changing the configuration of the numerical control devices (76).

The positional change obtaining unit (36) may be configured to obtain the positional change based on a measurement value measured by a measurement unit (34) provided in the machine tool (10, 42, 52, 70).

The measurement unit (34) may be comprised of an encoder of a motor configured to drive the table (22).

Third Invention

A parameter setting method sets a parameter relating to a speed of a table (22) of a machine tool (10, 42, 52, 70) in accordance with the weight of an object placed on the table (22). The parameter setting method includes: an operation control step of providing control such that the table (22) is operated according to a predetermined operation; a positional change obtaining step of obtaining a positional change of the table (22); and a parameter setting step (S3) of, by using a storage unit (38) storing the parameter corresponding to the positional change changed when the table (22) is operated according to the predetermined operation, setting the parameter based on the positional change obtained in the positional change obtaining step (S1) when the operation control step operates the table (22) according to the predetermined operation.

Thus, it is possible to automatically set a parameter relating to the speed of the table (22) of the machine tool (10, 42, 52, 70) in a manner appropriate for the weight of the objects placed thereon, by moving the table (22). This makes it possible to perform a suitable speed control of the table (22) in accordance with the weight of the objects placed thereon. This in turn makes it possible to optimize the machining cycle time, improve the machining accuracy to the workpiece (W) without damaging the machine tool (10, 42, 52, 70), and lengthen the life of the machine tool (10, 42, 52, 70).

The parameter may include at least one of a time constant and a maximum speed.

The present invention is not particularly limited to the embodiment described above, and various modifications are possible without departing from the essence and gist of the present invention.

What is claimed is:

1. A parameter setting device that is configured to set a parameter relating to a speed of a table of a machine tool in accordance with a weight of an object placed on the table, the device comprising:
    an operation control unit configured to provide control in a manner that the table is operated according to a predetermined operation;
    a positional change obtaining unit configured to obtain a positional change of the table;
    a storage unit that stores the parameter corresponding to the positional change caused when the table is operated according to the predetermined operation; and
    a parameter setting unit configured to set, by using the storage unit, the parameter based on the positional change obtained by the positional change obtaining unit when the operation control unit operates the table according to the predetermined operation.

2. The parameter setting device according to claim 1, wherein the parameter includes at least one of a time constant and a maximum speed.

3. A system comprising:
   the parameter setting device according to claim 1; and
   a driving control unit configured to perform a speed control of the table based on the parameter set by the parameter setting unit.

4. The system according to claim 3, wherein the system is the machine tool.

5. The system according to claim 4, wherein a numerical control device of the machine tool includes the parameter setting device and the driving control unit.

6. The system according to claim 4, wherein a numerical control device of the machine tool includes the driving control unit, and a control device different from the numerical control device includes the parameter setting device.

7. The system according to claim 3, further comprising a plurality of the machine tools each including a numerical control device,
   wherein each of the numerical control devices includes the driving control unit, and
   the numerical control device of one of the plurality of machine tools includes the parameter setting device.

8. The system according to claim 3, further comprising a plurality of the machine tools each including a numerical control device,
   wherein each of the numerical control devices includes the driving control unit, and
   a control device different from the numerical control devices includes the parameter setting device.

9. The system according to claim 3, wherein the positional change obtaining unit is configured to obtain the positional change based on a measurement value measured by a measurement unit provided in the machine tool.

10. The system according to claim 9, wherein the measurement unit comprises an encoder of a motor configured to drive the table.

11. A parameter setting method for setting a parameter relating to a speed of a table of a machine tool in accordance with a weight of an object placed on the table, the method comprising:
    an operation control step of providing control in a manner that the table is operated according to a predetermined operation;
    a positional change obtaining step of obtaining a positional change of the table; and
    a parameter setting step of, by using a storage unit storing the parameter corresponding to the positional change caused when the table is operated according to the predetermined operation, setting the parameter based on the positional change obtained in the positional change obtaining step when the operation control step operates the table according to the predetermined operation.

12. The parameter setting method according to claim 11, wherein the parameter includes at least one of a time constant and a maximum speed.

\* \* \* \* \*